(12) United States Patent
Pate

(10) Patent No.: US 11,406,211 B2
(45) Date of Patent: Aug. 9, 2022

(54) RESIDENTIAL PNEUMATIC MAILBOX AND MAILING SYSTEM

(71) Applicant: LaTroy Pate, Charlotte, NC (US)

(72) Inventor: LaTroy Pate, Charlotte, NC (US)

( * ) Notice: Subject to any disclaimer, the term of this patent is extended or adjusted under 35 U.S.C. 154(b) by 176 days.

(21) Appl. No.: 16/666,545

(22) Filed: Oct. 29, 2019

(65) Prior Publication Data
US 2020/0128990 A1   Apr. 30, 2020

Related U.S. Application Data

(60) Provisional application No. 62/753,078, filed on Oct. 31, 2018.

(51) Int. Cl.
| | | |
|---|---|---|
| *A47G 29/12* | (2006.01) | |
| *B65G 51/26* | (2006.01) | |
| *A47G 29/124* | (2006.01) | |
| A47G 29/122 | (2006.01) | |
| F21Y 115/10 | (2016.01) | |

(52) U.S. Cl.
CPC ....... *A47G 29/1212* (2013.01); *A47G 29/124* (2013.01); *A47G 29/1209* (2013.01); *A47G 29/12095* (2017.08); *B65G 51/26* (2013.01); *A47G 2029/1226* (2013.01); *B65G 2203/044* (2013.01); *F21Y 2115/10* (2016.08)

(58) Field of Classification Search
CPC .......... A47G 29/1212; A47G 29/12095; A47G 29/124; A47G 2029/1226; A47G 29/1225; A47G 29/1209; B65G 51/26; B65G 2203/044; B65G 2201/0285; B65G 11/04; F21Y 2115/10

USPC .............. 232/17, 19, 34–36, 38, 45; 40/566, 40/606.06; 193/8; 406/191
See application file for complete search history.

(56) References Cited

U.S. PATENT DOCUMENTS

| | | |
|---|---|---|
| 1,685,593 A | 9/1928 | Auble |
| 3,201,064 A | 8/1965 | Dagle |
| 3,612,438 A * | 10/1971 | Herndon ................ B65G 51/34 |
| | | 406/190 |
| 4,437,797 A | 3/1984 | Kardinal |
| 4,941,777 A | 7/1990 | Kieronski |
| 5,174,689 A | 12/1992 | Kondolf, Jr. |
| 5,215,412 A | 6/1993 | Rogoff et al. |
| (Continued) | | |

*Primary Examiner* — William L Miller
(74) *Attorney, Agent, or Firm* — Jeffrey C. Watson; Grell & Watson Patent Attorneys

(57) ABSTRACT

A residential pneumatic mailbox and mailing system includes a mailbox, a receiving unit, pneumatic tubing, a courier canister, a compressor, and a control unit. The mailbox is positioned along a curbside of a home. The receiving unit is positioned inside the home or on the outside of the home. The pneumatic tubing is connected between the mailbox and the receiving unit. The courier canister is sized to hold mail and is configured for moving back and forth in the pneumatic tubing between the mailbox and the receiving unit. The compressor and control unit are configured to control the movement of the courier canister within the pneumatic tubing back and forth between the mailbox and the receiving unit. Wherein, the residential pneumatic mailbox and mailing system is configured to transport the mail inside of the courier canister from the mailbox to the receiving unit, and vice versa.

13 Claims, 6 Drawing Sheets

(56) References Cited

U.S. PATENT DOCUMENTS

| | | | |
|---|---|---|---|
| 6,003,761 A * | 12/1999 | Chapman | A47G 29/1218 232/24 |
| 6,474,912 B1 | 11/2002 | Meeks | |
| 6,715,638 B2 | 4/2004 | Moeks | |
| 6,729,808 B1 | 5/2004 | Nelson | |
| 7,382,252 B2 * | 6/2008 | Brannon | G08B 7/064 232/19 |
| 7,988,035 B2 * | 8/2011 | Cox | A47G 29/12095 232/47 |
| 8,177,120 B2 * | 5/2012 | Wickart | G07F 7/04 232/1 D |
| 2003/0044243 A1 | 3/2003 | Tisdale | |
| 2006/0113368 A1 * | 6/2006 | Dudley | A47G 29/141 232/31 |
| 2009/0166403 A1 * | 7/2009 | Volpe | G07C 9/33 235/375 |
| 2009/0311054 A1 * | 12/2009 | Hoganson | B65G 51/08 406/14 |
| 2015/0298919 A1 * | 10/2015 | Le | B65G 51/32 406/110 |
| 2018/0352987 A1 * | 12/2018 | Kutas | A47G 29/1214 |

\* cited by examiner

RESIDENTIAL PNEUMATIC MAILBOX AND MAILING SYSTEM

CROSS-REFERENCE TO RELATED APPLICATIONS

This application claims benefit of priority application, U.S. Provisional Ser. No. 62/753,078 filed Oct. 31, 2018 entitled "Rural Residential Pneumatic Mailing System", which is incorporated herein by reference in its entirety.

FIELD OF THE DISCLOSURE

The present disclosure is directed to a mail and mailbox system. More specifically, the present disclosure relates to a residential pneumatic mailbox and mailing system.

BACKGROUND

The disclosure relates to anti-theft and home security system for the purpose of mailing, and more particularly, having the ability to allow the mail to move more rapidly from a roadside mailbox, to inside the home receiving unit, and the notification of said act being accomplished.

Currently in the field of postal services and mailing, existing products and/or services include the most basic of these devices, the U.S. mailbox, which primarily is placed upon a wooden post at curbside, as has been done for many years. The mailman then provides the service of delivering mail to the mailbox at curbside of the residence. The owner then must walk to the curbside to retrieve the mail out of the mailbox that was delivered by the mailman. In another instance, when the owner wants to send mail, the owner must walk the mail out to the mailbox and raise the flag on the side of the mailbox to alert the mailman that mail is to be picked up. The mailman then provides the service of picking up the mail from the mailbox at curbside of the residence. The service for the mailbox is to store mail at its most basic function.

In completely unrelated fields, namely the banking and medicals industries, a pneumatic tube is normally used at banks and hospitals to move information, money, specimens, the like, etc. from a point of origin, like a drive-up teller station at a bank, to a receiving destination, like the bank teller inside of the bank. As examples, the service for the pneumatic tube at a bank is to allow monetary transaction to occur without the consumer having to come into the bank, or the staff in the hospital to not have to walk long distances to deliver medicine or paperwork.

However, prior to the instant disclosure no one has combined the current curbside mailbox and mailing system with the pneumatic delivery system like used at banks and hospitals. The prior products and/or services are deficient in that they do not function together. As such, the instant disclosure may be the recognition and creativeness to provide technology to be used to integrate the two said prior art disclosures, basic mailbox and pneumatic delivery system, allowing them to function as one whole unit.

One problem with the current curbside mailbox and mailing system that has been recognized by the instant disclosure is the difficulty and danger that can occur from the owner retrieving and inserting mail into their curbside mailbox. This may be especially true in crime ridden neighborhoods, or for rural areas with long walks to the curb, or for the elderly, the disabled, the handicap, the like, etc., or during inclement weather. The current mailbox has no security measures, or even lighting advantages. As such, you can easily steal someone else's mail and get away with it. The current mailbox is also deficient in that it does not provide an illuminated street address that most consumers find difficult to view at night. Moreover, it does not provide an avenue for marketing or advertisement, and also does not allow the consumer to avoid inclement weather. Therefore, a need exists for an improved mailbox and mailing system.

The instant disclosure may be designed to address at least certain aspects of the problems discussed above by providing of a residential pneumatic mailbox and mailing system.

SUMMARY

In accordance with at least selected embodiments, the instant disclosure may address at least certain aspects of the above mentioned needs, issues and/or problems and may provide a residential pneumatic mailbox and mailing system. The residential pneumatic mailbox and mailing system may include a mailbox, a receiving unit, pneumatic tubing, a courier canister, a compressor, and a control unit. The mailbox may be positioned along a curbside of a home. The receiving unit may be positioned in the inside of the home or on the outside of the home. The pneumatic tubing may be connected between the mailbox positioned along the curbside of the home and the receiving unit positioned inside the home or on the outside of the home. The courier canister is sized to hold mail and is configured for moving back and forth in the pneumatic tubing between the mailbox and the receiving unit. The compressor and control unit may be configured to control the movement of the courier canister within the pneumatic tubing back and forth between the mailbox and the receiving unit. Wherein, the residential pneumatic mailbox and mailing system may be configured to transport the mail inside of the courier canister from the mailbox positioned along the curbside of the home to the receiving unit inside of the home or on the outside of the home, and vice versa.

One feature of the residential mailbox and mailing system may be that the mailbox can include an illumination light. The illumination light may be configured for illuminating area around the mailbox. In select embodiments, the illumination light may be an LED light positioned on a front of the mailbox. The LED light positioned on the front of the mailbox may be configured for illuminating the area around the mailbox. In select embodiments, the illumination light may be configured to automatically turn on at dark and back off when it is lighter.

Another feature of the residential mailbox and mailing system may be that the mailbox can include a first security camera. The first security camera may be positioned on a top of the mailbox. The first security camera may be aimed at a front of the mailbox. The first security camera may be configured for monitoring and/or recording in front of the mailbox around the curbside of the home.

Another feature of the residential mailbox and mailing system may be that the mailbox can include a second security camera. The second security camera may be positioned on a top of the mailbox. The second security camera may be aimed away from a back of the mailbox. The second security camera may be configured for monitoring and/or recording behind the mailbox in a yard between the mailbox and the home and of the home itself.

In select embodiments of the residential mailbox and mailing system, the mailbox may include the first security camera and the second security camera. In select embodiments, the first security camera and/or the second security camera may include night vision configured for monitoring and/or recording at night. The first security camera may be positioned on a top of the mailbox and aimed away from the front of the mailbox, where the first security camera may be configured for monitoring and/or recording in front of the mailbox in and around the curbside of the home. The second security camera may be positioned on a top of the mailbox and aimed away from a back of the mailbox, where the second security camera may be configured for monitoring and/or recording behind the mailbox in a yard between the mailbox and the home, and of the home itself. As a result, the combination of the first security camera and the second security camera may provide a 360 degree view around the mailbox for 24/7 monitoring and/or recording of the home, the yard, the mailbox, and its surroundings.

Another feature of the residential mailbox and mailing system may be that the mailbox can include an illuminated street address on one or both sides of the mailbox.

Another feature of the residential mailbox and mailing system may be that the mailbox can include an illuminated panel on one or both sides of the mailbox. The illuminated panel or panels may be for providing the illuminated street address, custom messages, streaming ads, or a combination thereof on one or both sides of the mailbox. In select embodiments, the illuminated panels on one or both sides of the mailbox being LCD ("Liquid Crystal Display") or LED ("Light Emitting Diode") displays configured to display the illuminated street address, the custom messages, the streaming ads, or the combinations thereof in set time intervals, wherein the set time intervals being 10-15 seconds.

Another feature of the residential mailbox and mailing system may be that the mailbox can include an automated shipment indicator. The automated shipment indicator may be configured for automatically indicating when mail is to be picked up by a mailman. In select embodiments, the automated shipment indicator may be a red light on the side of the mailbox that automatically illuminates when mail is inserted into the courier canister by the owner.

Another feature of the residential mailbox and mailing system may be that the mailbox can include an automated door. In select embodiments, the automated door may be steel. The automated door may be configured for automatically opening and closing for accessing the courier canister inside of the mailbox and locking the courier canister inside of the mailbox.

Another feature of the residential mailbox and mailing system may be the inclusion of a set of key fobs. The set of key fobs may be for operating the automated steel door of the mailbox. In select embodiments, the set of key fobs may include at least a first key fob for use by an owner for operating the automated steel door and a second key fob for use by a mailman for operating the automated steel door.

In select embodiments of the residential mailbox and mailing system, the control unit may be positioned in the receiving unit. The control unit may include a console configured for controlling the operation of the mailbox and the mailing system, including, but not limited to, controlling: the automated steel door; the first security camera; the second security camera; the illumination light; the movement of the courier canister between the mailbox and the receiving unit; the illuminated panels on one or both sides of the mailbox being LCD or LED displays configured to display the illuminated street address, custom messages, streaming ads, or combinations thereof in set time intervals. In select embodiments, the set time intervals of the illuminated panels may be, but clearly are not limited thereto, being 10-15 seconds.

In select embodiments of the residential pneumatic mailbox and mailing system, the mailbox may be made from seamless aluminum or metal and plastics.

In select embodiments of the residential pneumatic mailbox and mailing system, the mailbox may have a staff design. The staff design of the mailbox may generally include a vertical orientation.

In other select embodiments of the residential pneumatic mailbox and mailing system, the mailbox may have a unicorn design. The unicorn design of the mailbox may generally include an angled orientation leaning toward the front of the mailbox, where the automated steel door may be positioned approximately over the curbside.

Another feature of the residential mailbox and mailing system may be that the mailbox can include a breakaway feature. The breakaway feature may be at a base of the mailbox. The breakaway feature may be configured to allow the mailbox to fold downwards at the base to avoid severe damage when the mailbox is hit.

Another feature of the residential mailbox and mailing system may be that the mailbox can be configured as a security system, an advertising tool, a postal delivery mechanism, the like, and/or combinations thereof.

In another aspect, the instant disclosure embraces the residential pneumatic mailbox and mailing system including any various embodiments or combination of embodiments shown and/or described herein, including the combination of all elements or embodiments shown and/or described herein.

In another aspect, the instant disclosure embraces the residential mailbox of the pneumatic mailing system disclosed herein. The residential mailbox of the pneumatic mailbox may include any of the various embodiments described and/or shown herein.

In select embodiments of the residential mailbox of the pneumatic mailing system, the mailbox may include an illumination light. The illumination light may be configured for illuminating area around the mailbox. In select embodiments, the illumination light may be an LED light positioned on a front of the mailbox configured for illuminating the area around the mailbox. In other select embodiments, the illumination light may be configured to automatically turn on at dark and back off when it is lighter.

In other select embodiments of the residential mailbox of the pneumatic mailing system, the mailbox may include a first security camera. The first security camera may be positioned on a top of the mailbox and aimed at a front of the mailbox. The first security camera may be configured for monitoring and/or recording in front of the mailbox around a curbside of a home.

In other select embodiments of the residential mailbox of the pneumatic mailing system, the mailbox may include a second security camera. The second security camera may be positioned on a top of the mailbox and aimed away from a back of the mailbox. The second security camera may be configured for monitoring and/or recording behind the mailbox in a yard between the mailbox and the home, and of the home itself.

In other select embodiments of the residential mailbox of the pneumatic mailing system, the mailbox may include both the first security camera and the second security camera. In select embodiments, the first security camera and/or the second security camera may include night vision configured for monitoring and/or recording at night. The first security camera may be positioned on a top of the mailbox and aimed away from the front of the mailbox, where the first security camera may be configured for monitoring and/or recording in front of the mailbox in and around the curbside of the home. The second security camera may be positioned on a top of the mailbox and aimed away from a back of the mailbox, where the second security camera may be configured for monitoring and/or recording behind the mailbox in a yard between the mailbox and the home, and of the home itself. As a result, the combination of the first security camera and the second security camera may provide a 360 degree view around the mailbox for 24/7 monitoring and/or recording of the home, the yard, the mailbox, and its surroundings.

In other select embodiments of the residential mailbox of the pneumatic mailing system, the mailbox may include an illuminated street address on one or both sides of the mailbox.

In other select embodiments of the residential mailbox of the pneumatic mailing system, the mailbox may include an illuminated panel on one or both sides of the mailbox. The illuminated panel or panels on one or both sides of the mailbox may be for providing the illuminated street address, custom messages, streaming ads, the like, and/or various combinations thereof. In select embodiments, the illuminated panels on one or both sides of the mailbox may be LCD or LED displays configured to display the illuminated street address, the custom messages, the streaming ads, the like, and/or various combinations thereof in set time intervals. In select embodiments, the set time intervals of the illuminated panels may be, but clearly are not limited thereto, being 10-15 seconds.

In other select embodiments of the residential mailbox of the pneumatic mailing system, the mailbox may include an automated shipment indicator. The automated shipment indicator may be configured for automatically indicating when mail is to be picked up by a mailman. In select embodiments, the automated shipment indicator may be a red light on the side of the mailbox that automatically illuminates when mail is inserted into the courier canister by the owner.

In other select embodiments of the residential mailbox of the pneumatic mailing system, the mailbox may include an automated door. In select embodiments, the automated door may be steel. The automated door may be configured for automatically opening and closing for accessing an inside of the mailbox and locking the inside of the mailbox.

In other select embodiments of the residential mailbox of the pneumatic mailing system, the mailbox may include a set of key fobs. The set of key fobs may be for operating the automated door of the mailbox. In select embodiments, the set of key fobs may include at least a first key fob for use by an owner for operating the automated steel door and a second key fob for use by a mailman for operating the automated steel door;

In other select embodiments of the residential mailbox of the pneumatic mailing system, the mailbox may include a breakaway feature. The breakaway feature may be positioned at a base of the mailbox. The breakaway feature may be configured to allow the mailbox to fold downwards at the base to avoid severe damage when the mailbox is hit;

One feature of the residential mailbox of the pneumatic mailing system may be that the mailbox can be configured as a security system, an advertising tool, a postal delivery mechanism, the like, and/or various combinations thereof.

In other select embodiments of the residential mailbox of the pneumatic mailing system, the mailbox may be made from seamless aluminum or metal and plastics.

In other select embodiments of the residential mailbox of the pneumatic mailing system, the mailbox may have a staff design. The staff design of the mailbox may generally have a vertical orientation.

In other select embodiments of the residential mailbox of the pneumatic mailing system, the mailbox may have a unicorn design. The unicorn design of the mailbox may generally have an angled orientation leaning toward the front of the mailbox, where the automated steel door is positioned approximately over the curbside.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
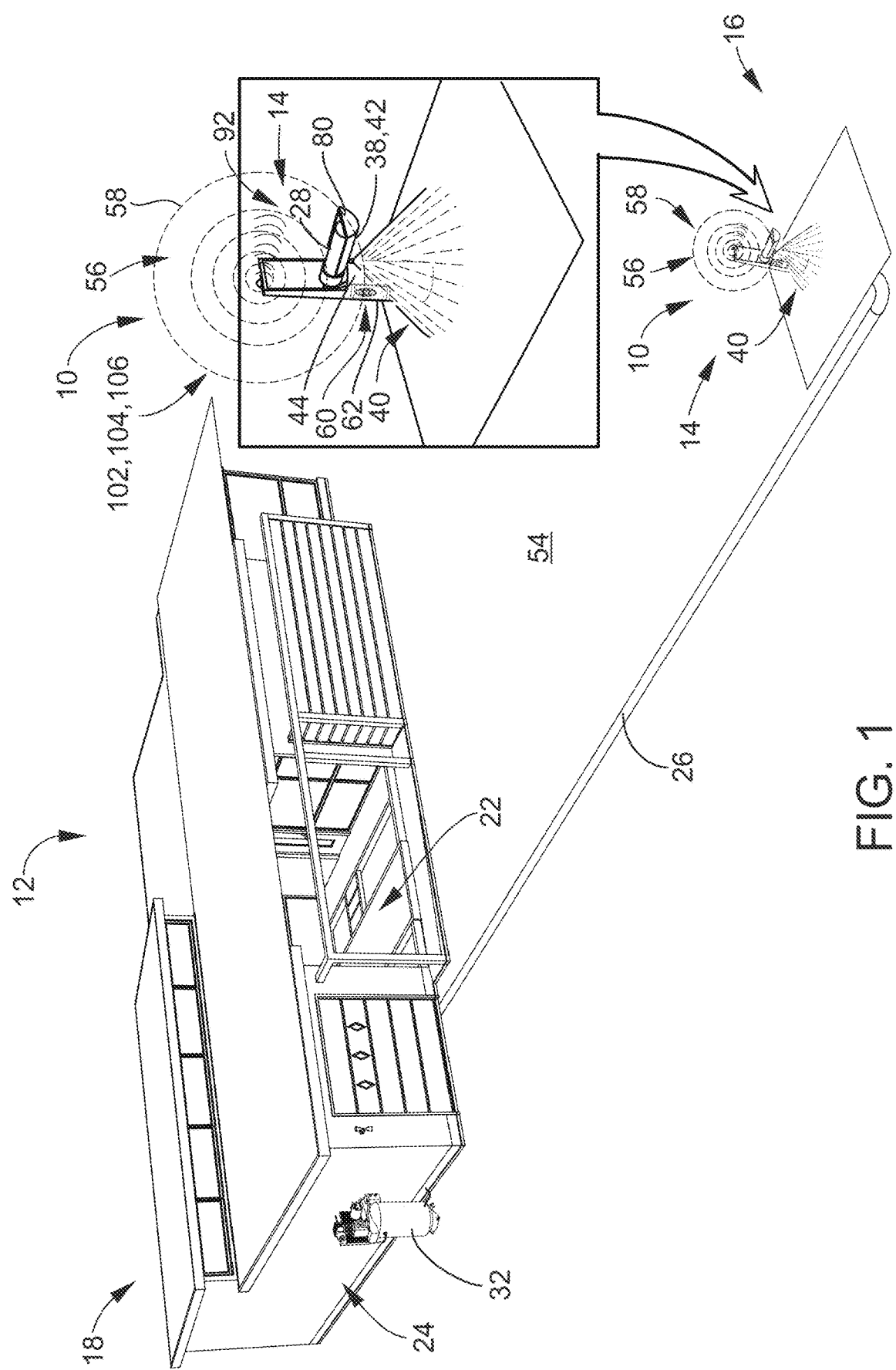
FIG. 1 is a top perspective schematic view of the residential pneumatic mailbox and mailing system according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-6, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-6, in a possibly preferred embodiment, the present disclosure overcomes the above-mentioned disadvantages and meets the recognized need for such an apparatus or method by providing of residential pneumatic mailbox 10 and mailing system 12. This residential pneumatic mailbox 10 and mailing system 12 may be for providing a safe and efficient mailing and mailbox system to residential home owners. Residential mailbox 10 of the pneumatic mailing system 12 may be configured as security system 102, advertising tool 104, postal delivery mechanism 106, the like, and/or various combinations thereof. Residential pneumatic mailbox 10 and mailing system 12 may generally include mailbox 14, receiving unit 20, pneumatic tubing 26, courier canister 28, compressor 32, and control unit 34. Residential pneumatic mailbox 10 and mailing system 12 may be configured to transport mail 30 inside of courier canister 28 from mailbox 14 positioned along curbside 16 of home 18 to receiving unit 20 inside of home 18, or on outside 24 of home 18, and vice versa. These general components of residential pneumatic mailbox 10 and mailing system 12, as shown in FIGS. 1-6, will be described in greater detail below.

Mailbox 14 may be included as residential pneumatic mailbox 10 of mailing system 12. See FIGS. 1-3 and 5. Mailbox 14 may be configured as postal delivery mechanism 106 for receiving and transporting mail 30 between itself and home 18. Mailbox 14 may also be configured as security system 102, advertising tool 104, and/or combinations thereof with postal deliver mechanism 106. Mailbox 14 may be positioned along curbside 16 of home 18.

One feature of residential pneumatic mailbox 10 and mailing system 12 may be that mailbox 14 can include illumination light 38. See FIGS. 1-3 and 5. Illumination light 38 may be for providing a safety feature of security system 102 for lighting area 40 around mailbox 14, like below and around curbside 16 where mailbox 14 is positioned. As such, illumination light 38 may be configured for illuminating area 40 around mailbox 14. In select embodiments, illumination light 38 may be LED light 42, or the like, positioned on front 44 of mailbox 14. LED light 42 positioned on front 44 of mailbox 14 may be configured for illuminating area 40 around mailbox 14. In select embodiments, illumination light 38 may be configured to automatically turn on at dark and back off when it is lighter. As such, illumination light 38 may include a lightness sensor for sensing the illumination of the environment around it with a set level of illumination required for turning on illumination light 38. Illumination light 38 may provide a stylish feature of mailbox 14 that may allow for night illumination and crash prevention. Illumination light 38 may also help first security camera 46 and/or second security camera 50 with clear nighttime visibility. Illumination light 38 may include lightness or solar sensors for turning illumination light 38 on and off at desired light levels and may also be controllable via console 90 on receiving unit 20.

One feature of residential pneumatic mailbox 10 and mailing system 12 may be that mailbox 14 can include first security camera 46. See FIGS. 1-3 and 5. First security camera 46 may be providing a safety feature of security system 102 for monitoring and/or recording a front side of mailbox 14, like the area in and around front 44 of mailbox 14, like curbside 16. First security camera 46 may be positioned on top 48 of mailbox 14. First security camera 46 may be aimed away from front 44 of mailbox 14. Accordingly, first security camera 46 may be configured for monitoring and/or recording in front of mailbox 14 around curbside 16 of home 18. In select embodiments, first security camera 46 may include night vision. As a result, first security camera 46 may be configured for monitoring and/or recording 24/7 in front of mailbox 14 around curbside 16 of home 18. First security camera 46 may be a wired or wireless security camera, like a Wi-Fi enabled security camera, that can be connected to the smart home system of home 18.

Another feature of residential pneumatic mailbox 10 and mailing system 12 may be that mailbox 14 can include second security camera 50. See FIGS. 1-3 and 5. Second security camera 46 may be providing a safety feature of security system 102 for monitoring and/or recording back side 52 of mailbox 14, like the area in yard 54 between mailbox 14 and home 18 and home 18. Second security camera 50 may be positioned on top 48 of mailbox 14. Second security camera 50 may be aimed away from back side 52 of mailbox 14. Second security camera 50 may be configured for monitoring and/or recording behind mailbox 14, like in yard 54 between mailbox 14 and home 18 and of home 18. Second security camera 50 may be a wired or wireless security camera, like a Wi-Fi enabled security camera, which can be connected to the smart home system of home 18.

Figure 3:
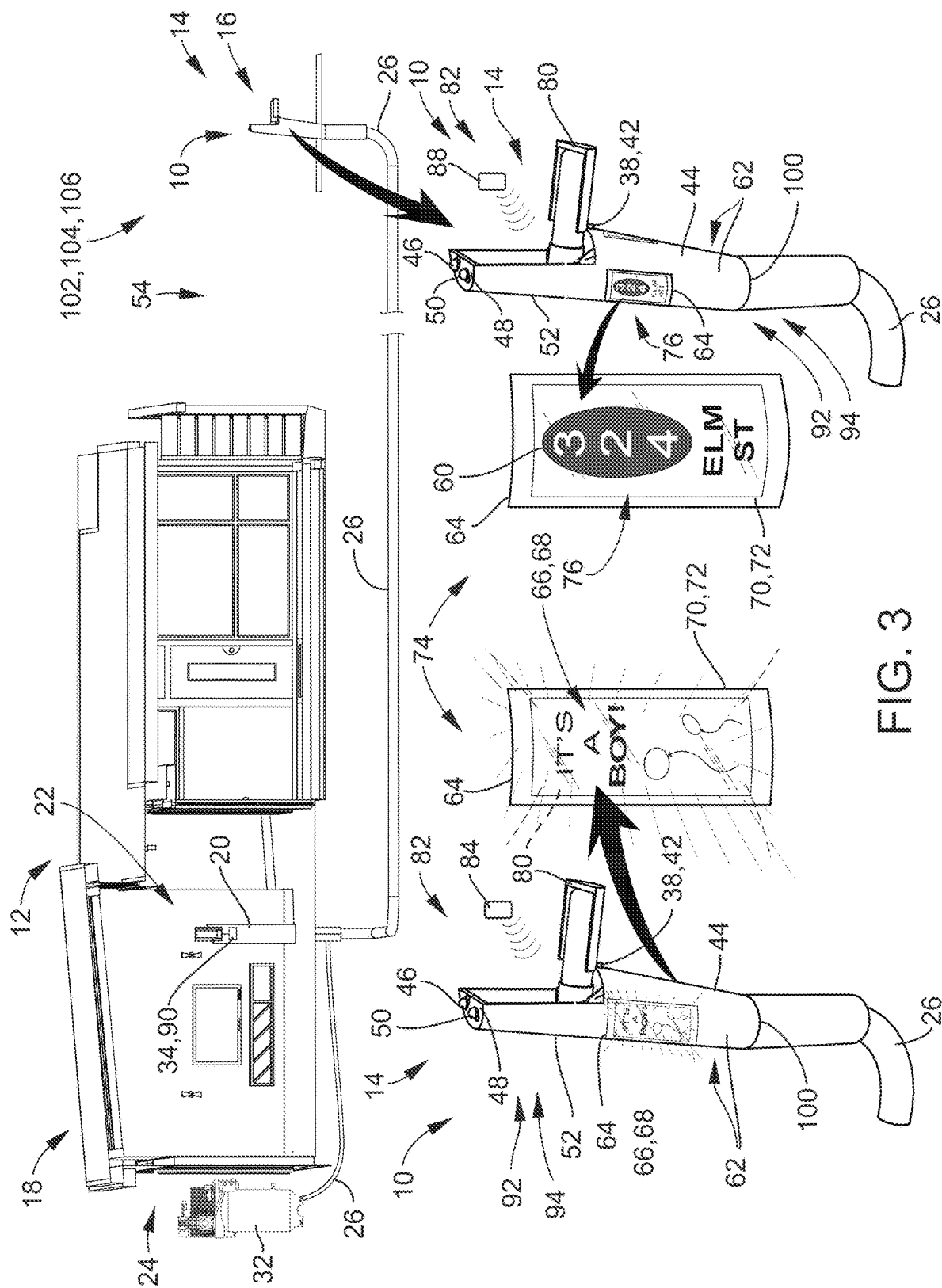
FIG. 3 is a cross-sectional side view of the residential pneumatic mailbox and mailing system of FIG. 2 with zoomed in view of the residential pneumatic mailbox with various illuminated street addresses, messages and/or advertisements on the illuminated side panels on one or both sides of the mailbox.

Another feature of residential pneumatic mailbox 10 and mailing system 12 may be that mailbox 14 can include both first security camera 46 and second security camera 50, as shown in FIG. 3. The combination 56 of both first security camera 46 and second security camera 46 may be for providing a safety feature of security system 102 for monitoring and/or recording both front 44 and back side 52 of mailbox 14, like for providing 360 degree view 58 around mailbox 14. In select embodiments, first security camera 46 and/or second security camera 50 may include night vision configured for monitoring and/or recording at night. First security camera 46 may be positioned on top 48 of mailbox 14 and aimed away from front 44 of mailbox 14, where first security camera 46 may be configured for monitoring and/or recording in front of mailbox 14 in and around curbside 16 of home 18. Second security camera 50 may be positioned on top 48 of mailbox 14 and aimed away from back 53 of mailbox 14, where second security camera 50 may be configured for monitoring and/or recording behind mailbox 14, like in yard 54 between mailbox 14 and home 18 and of home 18. As a result, combination 56 of first security camera 46 and second security camera 50 may provide 360 degree view 58 around mailbox 14 for 24/7 monitoring and/or recording of home 18, yard 54, mailbox 14, and its surroundings. Both first security camera 46 and second security camera 50 may be wired or wireless security cameras, like Wi-Fi enabled security cameras, that can be connected to the smart home system of home 18.

One feature of residential pneumatic mailbox 10 and mailing system 12 may be that mailbox 14 can include illuminated street address 60. See FIGS. 1-3 and 5. Illuminated street address 60 may be for providing an illuminated view of the street address of home 18 for more visibility, especially at night or during low lightness events like inclement weather. Illuminated street address 60 may be positioned on one or both sides 62 of mailbox 14. Illuminated street address 60 may be illuminated by any means.

Another feature of residential pneumatic mailbox 10 and mailing system 12 may be that mailbox 14 can include illuminated panel 64 or multiple illuminated panels 64. See FIGS. 1-3 and 5. Illuminated panels 64 may be for providing illuminated street address 60, custom messages 66, streaming advertisements 68, the like, and/or combinations thereof on one or both sides 63 of mailbox 14. Illuminated panel or panels 64 may thus be on one or both sides 63 of mailbox 14. Illuminated panel or panels 64 may be for providing illuminated street address 60, custom messages 66, streaming ads 68, the like, and/or various combination thereof on one or both sides 62 of mailbox 14. As examples, and clearly not limited thereto, in select embodiments, illuminated panels 64 on one or both sides 62 of mailbox 14 may be LCD display 70 or LED display 72. The LCD display 70 or LED display 72 may be configured to display illuminated street address 60, custom messages 66, streaming ads 68, and/or various combinations thereof in set time intervals 74. As examples, set time intervals 74 may be, but are clearly not limited thereto, set time intervals of 10-15 seconds where illuminated panel or panels 64 rotate between illuminated street address 60, custom messages 66, and/or streaming ads 68. Custom messages 66 may be any custom messages, including, but not limited to, Happy Birthday, It's a Boy, the like, etc. Streaming ads 68 may be any advertisements or the like displayed on illuminated panel or panels 64, like paid advertisements or advertisements used in lieu of payment for residential pneumatic mailbox 10 and mailing system 12. Streaming ads 68 may prevent spammers from leaving mail at mailbox 14, may help gain revenue for the owner and/or installer. Illuminated panel or panels 64 may be connected to the smart home system of home 18 for programming and modifying the displayed illuminated street address 60, custom messages 66, streaming ads 68, and/or various combinations thereof, and the set time intervals 74 between each displayed illuminated street address 60, custom messages 66, streaming ads 68, and/or various combinations thereof.

Another feature of residential pneumatic mailbox 10 and mailing system 12 may be that mailbox 14 can include automated shipment indicator 76. Automated shipment indicator 76 may be for automatically indicating to a mailman when mail 30 or a package is ready for pickup and delivery, similar to the flag on the side of standard mailboxes. As such, automated shipment indicator 76 may be configured for automatically indicating when mail 30 is to be picked up by a mailman. In select embodiments, automated shipment indicator 76 may be a light, like a red light, on the side of mailbox 14 that automatically illuminates when mail is inserted into courier canister 28 by the owner. The red indicator light of the automated shipment indicator 76 may be used for outgoing mail reducing the need for a flag and providing a sturdier more reliable option for indicating the need for outgoing mail to be picked up by the mailman.

Figure 2:
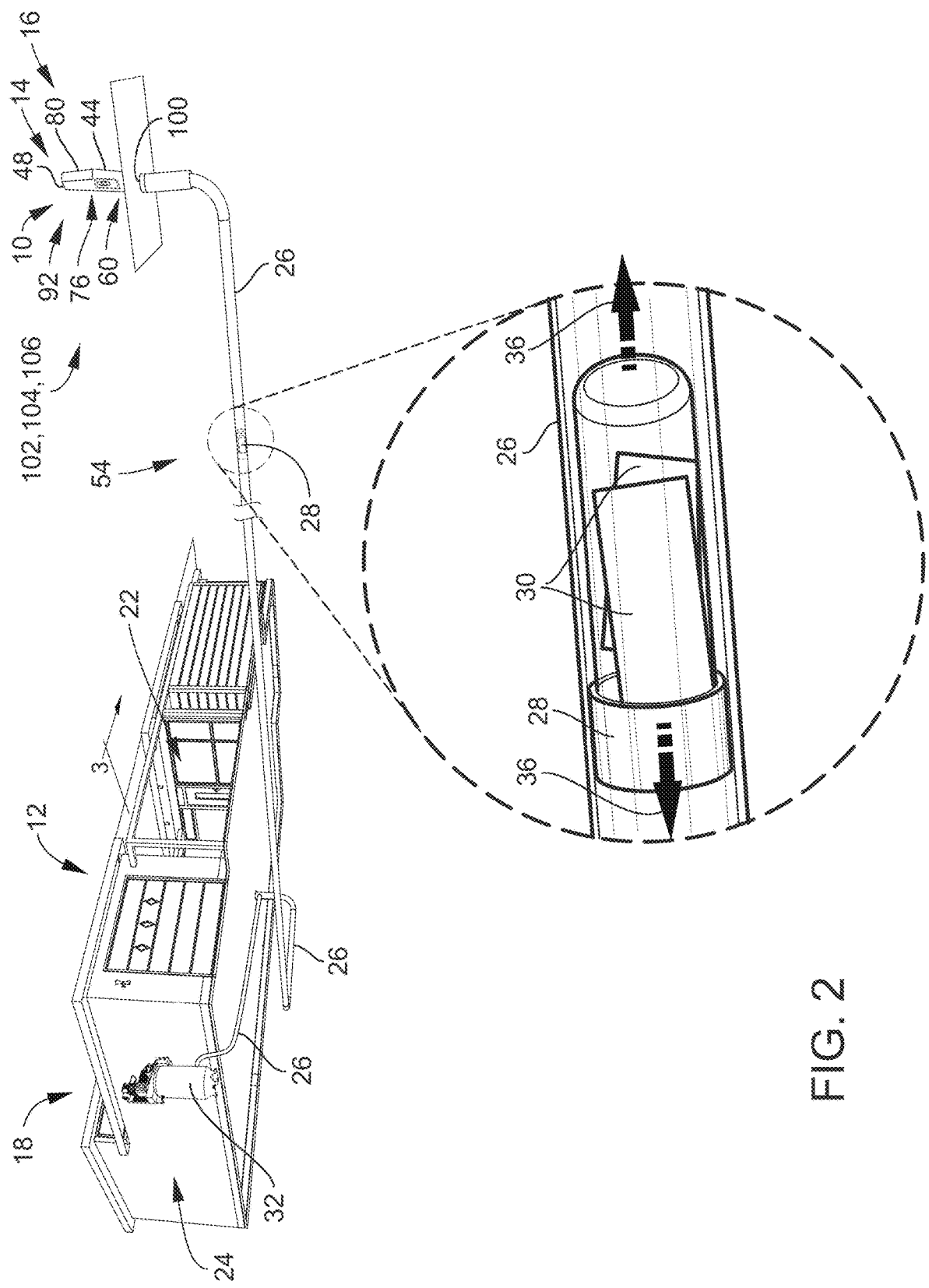
FIG. 2 is a bottom perspective schematic view of the residential pneumatic mailbox and mailing system of FIG. 1 according to select embodiments of the instant disclosure.
Figure 5:
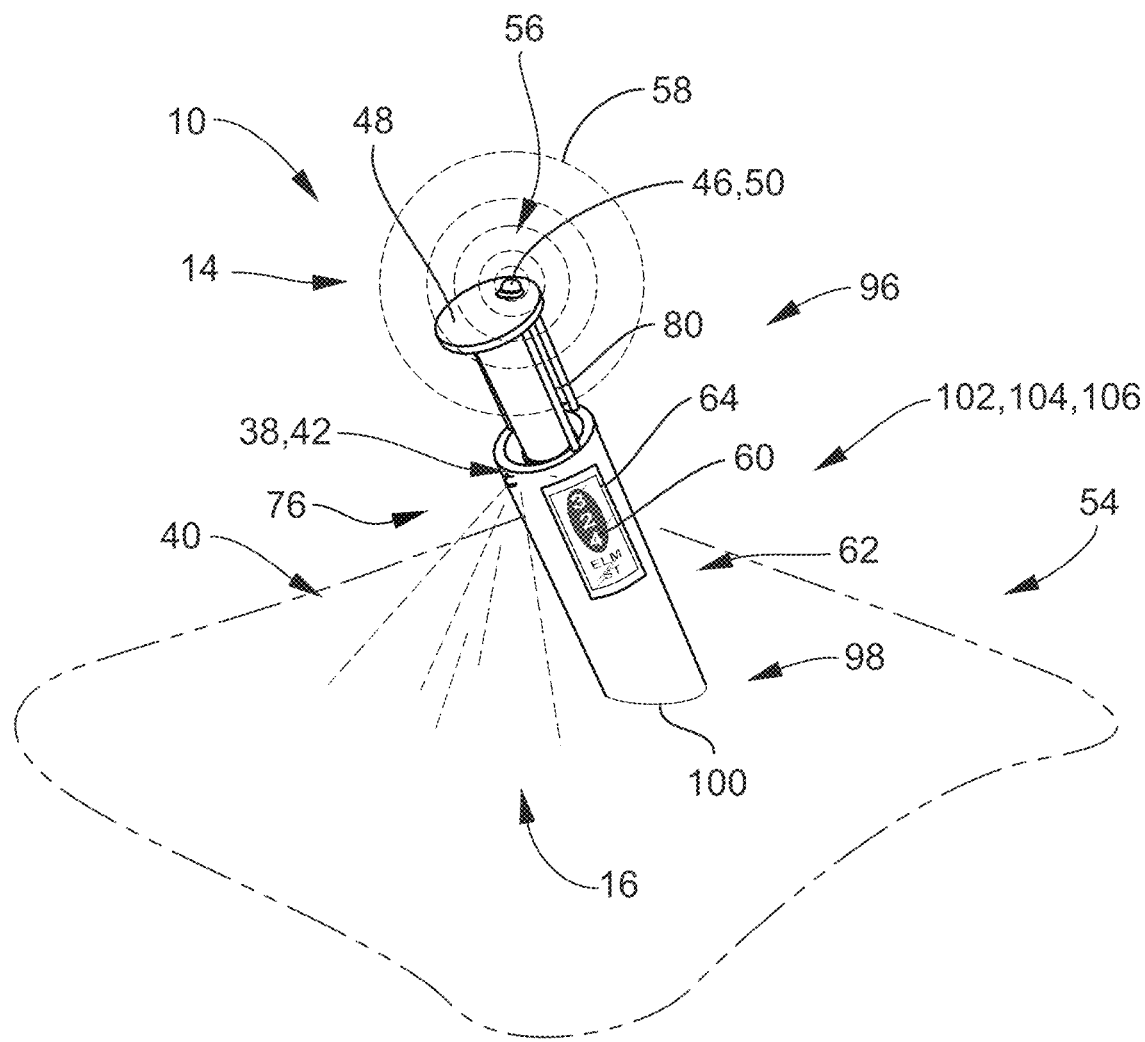
FIG. 5 is a side perspective view of the residential pneumatic mailbox of the mailing system according to select embodiments of the instant disclosure, where the mailbox is shown in the unicorn design.

Another feature of residential pneumatic mailbox 10 and mailing system 12 may be that mailbox 14 can include automated door 80. Automated door 80 may be for providing a means and mechanism for automatically opening and closing mailbox 14 for accessing and locking courier canister 28 inside mailbox 14. In select embodiments, automated door 80 may be made from steel for securely locking courier canister with mail 30 inside mailbox 14. As such, automated door 80 may be configured for automatically opening and closing for accessing courier canister 28 inside of mailbox 14 and locking courier canister 28 inside of mailbox 14. As shown in FIGS. 1-3, in select embodiments automated door 80 may hinge downwards for accessing the inside of mailbox 14. In other select embodiments, as shown in FIG. 5, automated door 80 may rotate around for accessing the inside of mailbox 14. The secure folding or revolving automated door 80 may replace current mailbox doors that can easily be accessed by the public. Automated door 80 may be accessible only by the mailman and homeowner and may provide a secure and durable door for mailbox 14.

Another feature of residential pneumatic mailbox 10 and mailing system 12 may be that mailbox 14 can include set of key fobs 82. See FIG. 3. Set of key fobs 82 may be for operating automated door 80 for accessing and locking the inside of mailbox 14. As such, set of key fobs 82 may be for operating automated steel door 80 of mailbox 14. In select embodiments, set of key fobs 82 may include, at least, first key fob 84 for use by an owner for operating automated steel door 80 and second key fob 88 for use by a mailman for operating automated steel door 80.

Figure 4:
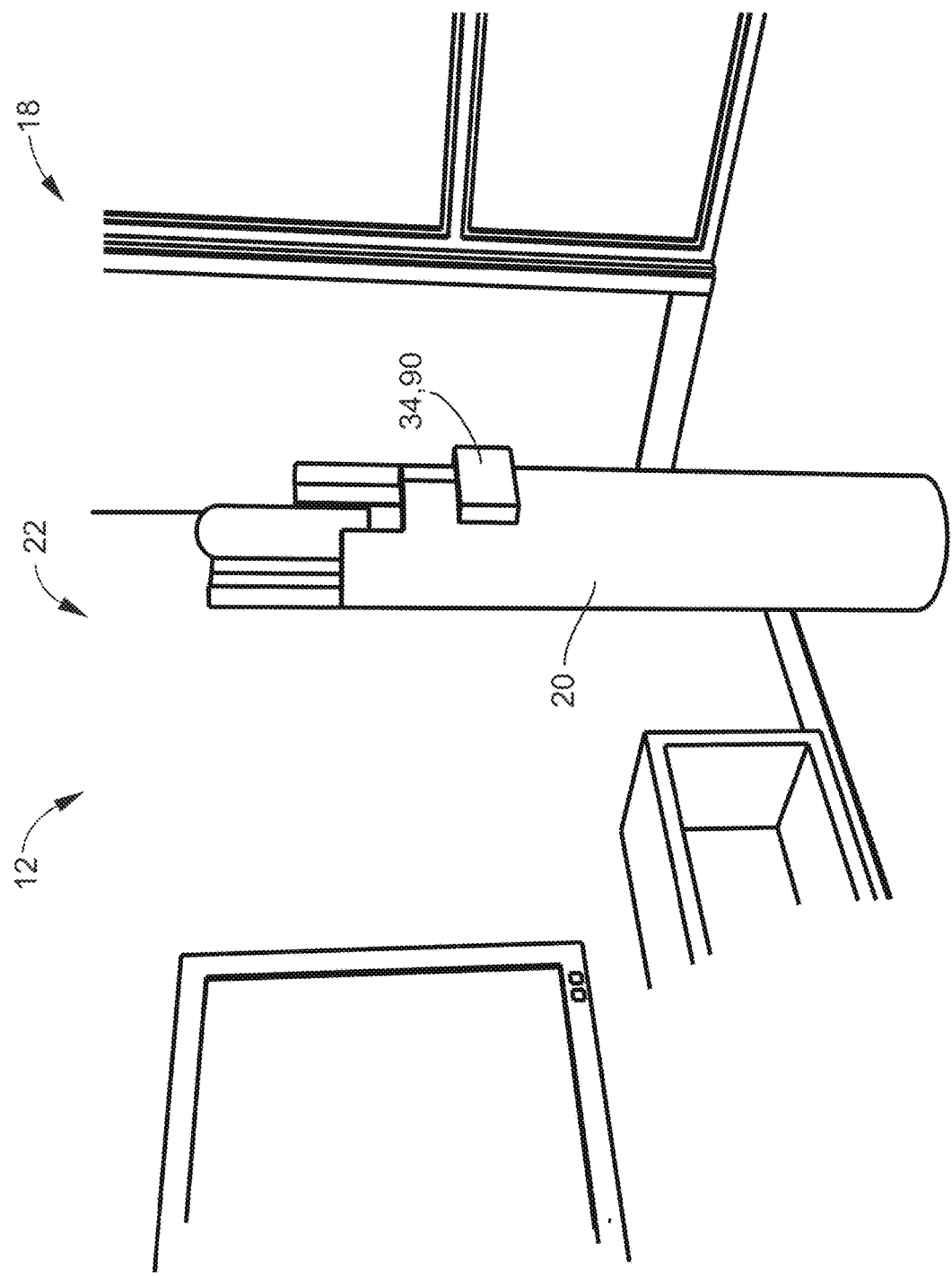
FIG. 4 is a schematic perspective view of the inside of a home with the mailing system showing the receiving unit according to select embodiments of the instant disclosure.

Receiving unit 20 may be included with residential pneumatic mailbox 10 and mailing system 12. See FIGS. 3 and 4. Receiving unit 20 may be configured for receiving mail 30 on inside 22 of home 18, like for new construction houses, townhomes, condos, the like, etc., or for receiving mail 30 on outside 24 of home 18 for houses, townhomes, condos, the like, etc. that are retrofitted with mailing system 12. As such, receiving unit 20 may be positioned in inside 22 of home 18 (as shown in FIGS. 3 and 4) or on outside 24 of home 18. On inside 22 of home 18, receiving unit 20 may be positioned in a common are, like a foyer or the like. On outside 24 of home 18, receiving unit 20 may be positioned near an entrance or doorway, or on a porch, deck or the like.

Figure 6:
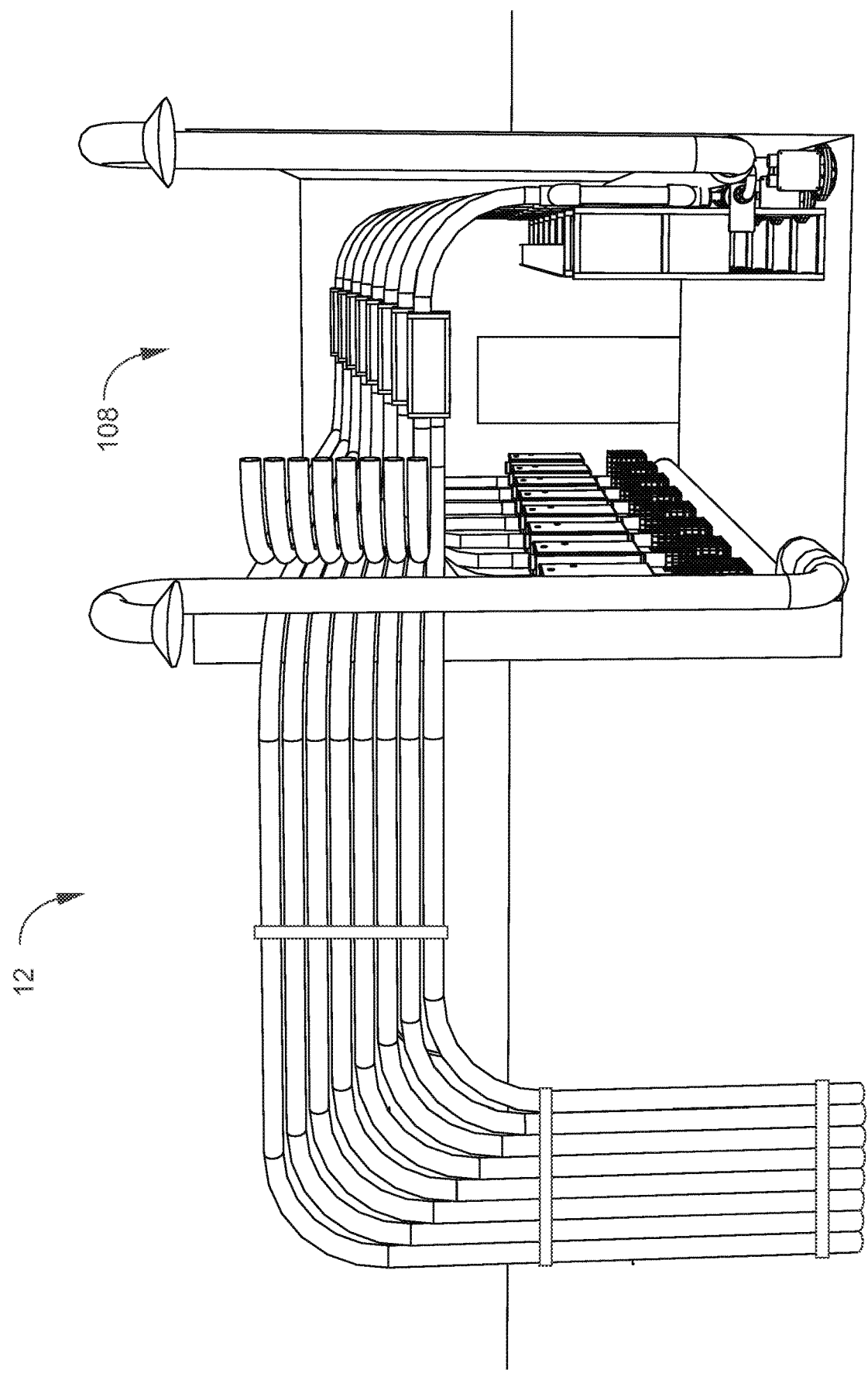
FIG. 6 is a perspective schematic view of the residential pneumatic mailbox and mailing system according to select embodiments of the instant disclosure showing the distribution center for linked subdivisions.

Pneumatic tubing 26 may be included with residential pneumatic mailbox 10 and mailing system 12. See FIGS. 1-3 and 6. Pneumatic tubing 26 may be for connecting and providing a conduit for courier canister 28 between mailbox 14 on curbside 16 of home 18 to receiving unit 20 on inside 22 or on outside 24 of home 18. As such, pneumatic tubing 26 may be connected between mailbox 14 positioned along curbside 16 of home 18 and receiving unit 20 positioned on inside 22 of home 18 or on outside 22 of home 18. Pneumatic tubing 26 may include any desired length, radius, material, connections, bends, the like, etc. for connecting and providing a conduit for courier canister 28 between mailbox 14 on curbside 16 of home 18 to receiving unit 20 on inside 22 or on outside 24 of home 18. As an exampled, and clearly not limited thereto, in select embodiments, pneumatic tubing 26 may be PVC ("polyvinyl chloride") piping be connected between mailbox 14 positioned along curbside 16 of home 18 and receiving unit 20 positioned on inside 22 of home 18 or on outside 22 of home 18. As shown in FIGS. 2 and 3, pneumatic tubing 26 may also include tubing for connecting compressor 32, like on outside 24 of home 18, to or between receiving unit 20 and/or mailbox 14. As shown in FIG. 6, pneumatic tubing 26 may also include tubing for connecting distribution center 108 for linked subdivisions with multiple houses, townhomes, condos, or the like.

Courier canister 28 may be included with residential pneumatic mailbox 10 and mailing system 12. See FIGS. 1 and 2. Courier canister 28 may be for moving mail back and forth between mailbox 14 and receiving unit 20 through the conduit of pneumatic tubing 26. As such, courier canister 28 may be sized and configured to be moved in the conduit created by pneumatic tubing 26 via air movement 36 created by compressor 32. Courier canister 28 may be sized to hold mail 30. As such, courier canister 28 may be configured for moving back and forth in pneumatic tubing 26 between mailbox 14 and receiving unit 20. Courier canister 28, as best shown in FIG. 2 may be sized and shaped similar to a pneumatic bank teller canister. However, the disclosure is not so limited and courier canister 28 may take any desired size and shape for fitting any size and/or shape of mail 30.

Compressor 32 may be included with residential pneumatic mailbox 10 and mailing system 12. See FIGS. 1-3. Compressor 32 may be for providing the forced air for movement 36 of courier canister 28 in pneumatic tubing 26 back and forth between mailbox 14 and receiving unit 20.

Compressor 32 may be positioned anywhere on inside 22 and/or on outside 24 of home 18. In select possibly preferred embodiments, as shown in FIGS. 1-3, compressor 32 may be positioned on outside 24 of home 18, similar to a heating and air conditioning unit. Compressor 32 may be sized and configured for various size homes 18 with various size yards 54 with distances from home 18 to mailbox 14 at curbside 16. Compressor 32 may be any type of compressor including, but not limited to, a compressor similar to that used in pneumatic bank teller systems.

Control unit 34 may be included with residential pneumatic mailbox 10 and mailing system 12. See FIGS. 3-4 Control unit 34 may be for controlling compressor 32 and the resultant movement 36 of courier canister 28 within pneumatic tubing 26 back and forth between mailbox 14 and receiving unit 20. As such, control unit 34 may be configured to control movement 36 of courier canister 28 within pneumatic tubing 26 back and forth between mailbox 14 and receiving unit 20 via controlling compressor 32. In select embodiments of the residential mailbox 10 and mailing system 12, control unit 34 may be positioned in receiving unit 20. Control unit 34 may include console 90 configured for controlling the operation of mailbox 14 and mailing system 12, including, but not limited to, controlling: automated steel door 80; first security camera 46; second security camera 50; illumination light 38; movement 36 of courier canister 28 between mailbox 14 and receiving unit 20; illuminated panels 64 on one or both sides 62 of mailbox 14 configured to display illuminated street address 60, custom messages 66, streaming ads 68, the like, and/or various combinations thereof, set time intervals 74, and/or various combinations thereof.

In select embodiments of the residential pneumatic mailbox 10 and mailing system 12, mailbox 14 may be made from seamless aluminum or metal and plastics.

In select embodiments of the residential pneumatic mailbox 10 and mailing system 12, mailbox 14 may have staff design 92. See FIGS. 1-3. Staff design 92 of mailbox 14 may generally include vertical orientation 94 of mailbox 14. In select embodiments, staff design 92 may also include, but is not limited to, automated door 80 hinging downwards for accessing courier canister 28 inside mailbox 14.

In other select embodiments of the residential pneumatic mailbox 10 and mailing system 12, mailbox 14 may have unicorn design 96. See FIG. 5. Unicorn design 96 of mailbox 14 may generally include angled orientation 98 leaning toward front 44 of mailbox 14, where automated steel door 80 may be positioned approximately over curbside 16. In select embodiments, unicorn design 96 may also include, but is not limited to, automated door 80 rotating around for accessing courier canister 28 inside mailbox 14.

Another feature of residential mailbox 10 and mailing system 12 may be that mailbox 14 can include breakaway feature 100. See FIGS. 2-3 and 5. Breakaway feature 100 may be for providing a safety feature for mailbox 14 for preventing damage to mailbox 14 when it is accidentally hit or run over. Breakaway feature 100 may be at the base of mailbox 14. As a result, breakaway feature 100 may be configured to allow mailbox 14 to fold downwards at the base to avoid severe damage when the mailbox is hit or run over.

In another aspect, the instant disclosure embraces residential pneumatic mailbox 10 and mailing system 12 including any various embodiments or combination of embodiments shown and/or described herein, including the combination of all elements or embodiments shown and/or described herein.

In another aspect, the instant disclosure embraces the residential mailbox 10 or 14 of pneumatic mailing system 12 disclosed herein. The residential mailbox 10 or 14 of pneumatic mailing system 12 may include any of the various embodiments described and/or shown herein.

Referring now to FIG. 6, residential pneumatic mailbox 10 and mailing system 12 may also include a distribution system 108. Distribution system 108 may be for providing a central location, like a common area, basement of a building, the like, etc. for distributing mail 30 to multiple mailboxes 14. Distribution system 108 may thus including multiple pneumatic tubing systems that connect multiple mailboxes 14 to distribution system 108.

The rural residential pneumatic mailbox 10 and mailing system 12 generally includes mailbox 14 of new design connected to a pneumatic tubular system. The disclosed device includes several components. An elongated newly designed mailbox 14 that provides security measures such as automated steel door 80 that is functioned by set of key fobs 82, designed for the opening and closing of said automated steel door 80. The disclosure has two cameras, first security camera 46 and second security camera 50, attached to front 44 and rear 52 of mailbox 14, which allows a 360 degree angle view 58 and night vision for the purposes of 24/7 streaming of land and property. LED lights 42 are also placed on mailbox 14 to provide illumination after daylight hours. The tubular system has a courier canister 28 that is regulated by a control unit 34 which operates an air compressor 32 to function and provide movement 36 in pneumatic tubing 26, thereby allowing courier canister to flow from one point to another. The disclosed device also is connected to console 90 in which all functionality of said disclosure are produced, such as automated steel door 80, automated cameras 46 and 50, and illumination lights 38, the sending and receiving of courier canister 28, and the function for the illuminated street address 60 and streaming ads 68 and/or messages 66 that also come built in on mailbox 14.

In use, the rural residential pneumatic mailbox 10 and mailing system 12 function as a postal device which provides security and safety measures for the consumer. It allows mail 30 to be rapidly received without going out in inclement weather. It provides security with functioning cameras 46 and 50 and LED lights 42. It also provides companies and consumer a new marketing tool while illuminating address 60 and streaming adds 68 and/or messages 66 on set time interval 74, of like a 10-15 second interval.

A feature of the present disclosure may be its ability to provide the consumer the privilege of avoiding inclement and dangerous trips to mailbox 14 in said weather for the elderly and disabled. Another feature of the disclosure may be its built in LED illumination lights 38, 42 and cameras 46 and 50 which provide a 360 degree view 58 from street to front of consumer's residence [location]. The cameras 46 and 50 can also stream video for 24 hours, 7 days a week while providing night vision during the late hours.

Another feature of the disclosure may be its ability to provide an illuminated home address 60 making it more visible during night hours. The disclosure also streams ads 68 from companies giving the consumer and neighbors the advantage to see deals before others, because companies can stream ads daily on a 10-15 second interval while returning to view the consumer's home address.

Another feature of the disclosure may be its eco-friendly because the compressed air can be dumped straight into the atmosphere without causing harm.

In sum, the rural residential pneumatic mailbox 10 and mailing system 12 may be compromised of PVC pneumatic tubing 26 of a hollow tube of plastic, which will substantially traverse the length of an entire yard space 54. The mailbox 14 can be composed of seamless aluminum and plastics making it lightweight and durable. Mailbox 14 and PVC pneumatic tubing 26 may then be connected to air compressor 32 and control unit 34 which allows movement of courier canister 28 inside of pneumatic tubing 26. Mailbox 14 may also be connected to receiving unit 20 with control unit 34 and operated via console 90 for sending and receiving which allows such functions as automated shipment indicator 76, cameras 46 and 50, and LED illumination light 38, 42 functions, illuminated panels 64 for illuminated home address 60 and streaming consumer ads 68 and custom messages 66. Mailbox 14 may also have set of key fobs 82 which may allow access only for owner and postman. Mailbox 14 may thus provide 360 degree angle views 58 for security purposes and LED illumination light 38, 42 for land illumination during inclement weather and night hours.

Mailbox 14 also provides an illuminated LCD display 70 or LED display 72 of screens which can stream consumer ads 68 or custom messages 66 while showing an illuminated home address 60 in 10-15 second intervals. Mailbox 14 may also have two separate locations for receiving units, one that can be accessed from the front porch area (pre-existing homes) or the other that can be accessed from the foyer most likely from new homes. Mailbox 14 in short functions as security system 102, advertising tool 104 and postal remedy 106. Residential pneumatic mailbox 10 and mailing system 12 may thereby provide no reason to go out a long driveway in inclement weather to get mail 30. Mailbox 14 may also have breakaway feature 100 at the bottom of the post to avoid severe damage or death for an unlikely driver that hits mailbox 14.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. A residential pneumatic mailbox and mailing system comprising:
　a mailbox positioned along a curbside of a home, the mailbox including:
　　an illumination light configured for illuminating area around the mailbox;
　　a first security camera with night vision and positioned on a top of the mailbox, the first security camera is aimed away from a front of the mailbox, where the first security camera is configured for monitoring or recording in front of the mailbox in and around the curbside of the home; and
　　a second security camera with the night vision positioned on the top of the mailbox, the second security camera is aimed away from a back of the mailbox, where the second security camera is configured for monitoring or recording behind the mailbox in a yard between the mailbox and the home, and of the home;
　　an illuminated panel on one or both sides of the mailbox for providing an illuminated street address, custom messages, streaming ads, or a combination thereof; and
　　an automated door configured for automatically opening and closing for accessing a courier canister inside of the mailbox and locking the courier canister inside of the mailbox;
　a receiving unit positioned in an inside of the home or on an outside of the home;
　pneumatic tubing connected between the mailbox and the receiving unit;
　the courier canister is sized and configured to hold mail and configured for moving back and forth in the pneumatic tubing between the mailbox and the receiving unit; and
　a compressor and control unit configured to control movement of the courier canister within the pneumatic tubing back and forth between the mailbox and the receiving unit, wherein the control unit is configured for controlling:
　　the automated door;
　　the first security camera;
　　the second security camera;
　　the illumination light; and
　　the illuminated panels on one or both sides of the mailbox to display the illuminated street address, the custom messages, the streaming ads, or the combinations thereof, in set time intervals;
　wherein, the residential pneumatic mailbox and mailing system is configured to transport the mail inside of the courier canister from the mailbox positioned along the curbside of the home to the receiving unit on the inside of the home or on the outside of the home, and vice versa.

2. The residential pneumatic mailbox and mailing system of claim 1, wherein the illumination light is an LED light positioned on a front of the mailbox configured for illuminating the area around the mailbox, where the illumination light is configured to automatically turn on at dark and back off when it is lighter.

3. The residential pneumatic mailbox and mailing system of claim 1, wherein, a combination of the first security camera and the second security camera providing a 360 degree view around the mailbox for 24/7 monitoring or recording of the home, the yard, the mailbox, and its surroundings.

4. The residential pneumatic mailbox and mailing system of claim 1, wherein the mailbox including the illuminated street address on one or both sides of the mailbox.

5. The residential pneumatic mailbox and mailing system of claim 1, wherein the set time intervals being 10-15 seconds.

6. The residential pneumatic mailbox and mailing system of claim 1, wherein the illuminated panels on one or both sides of the mailbox being LCD or LED displays configured to display the illuminated street address, the custom messages, the streaming ads, or the combinations thereof.

7. The residential pneumatic mailbox and mailing system of claim 1, wherein the mailbox further including an automated shipment indicator configured for automatically indicating when outgoing mail is to be picked up by a mailman, wherein the automated shipment indicator is a red light positioned on the side of the mailbox that automatically illuminates when the outgoing mail is inserted into the courier canister through the receiving unit by an owner.

8. The residential pneumatic mailbox and mailing system of claim 1 further including a set of key fobs for operating the automated door of the mailbox, the set of key fobs including at least a first key fob for use by an owner for operating the automated door and a second key fob for use by a mailman for operating the automated door.

9. The residential pneumatic mailbox and mailing system of claim 1, wherein the control unit is positioned in the receiving unit and includes a console configured for controlling:
   the automated door;
   the first security camera;
   the second security camera;
   the illumination light;
   movements of the courier canister between the mailbox and the receiving unit; and
   the illuminated panels on one or both sides of the mailbox being LCD or LED displays configured to display an illuminated street address, custom messages, streaming ads, or combinations thereof, in set time intervals, wherein the set time intervals being 10-15 seconds.

10. The residential pneumatic mailbox and mailing system of claim 1, wherein the mailbox is made from seamless aluminum or metal and plastics, where an automated door is made of steel, and wherein the mailbox having:
   a staff design with a vertical orientation; or
   a unicorn design with an angled orientation leaning toward the front of the mailbox, where an automated door is positioned approximately over the curbside.

11. The residential pneumatic mailbox and mailing system of claim 10, wherein the mailbox including a breakaway feature at a base of the mailbox, the breakaway feature is configured to allow the mailbox to fold downwards at the base to avoid severe damage when the mailbox is hit.

12. The residential pneumatic mailbox and mailing system of claim 1, wherein the mailbox is configured as a security system, an advertising tool, and a postal delivery mechanism.

13. A residential pneumatic mailbox and mailing system comprising:
   a mailbox positioned along a curbside of a home, the mailbox having:
      a staff design with a vertical orientation; or
      a unicorn design with an angled orientation leaning toward a front of the mailbox, where an automated door is positioned approximately over the curbside;
   the mailbox including an illumination light configured for illuminating an area around the mailbox, the illumination light positioned on the front of the mailbox configured for illuminating the area around and below the mailbox, where the illumination light is configured to automatically turn on at dark and back off when it is lighter;
   the mailbox further including:
      a first security camera with night vision positioned on a top of the mailbox and aimed away from the front of the mailbox, where the first security camera is configured for monitoring or recording in front of the mailbox in and around the curbside of the home; and
      a second security camera with the night vision positioned on the top of the mailbox and aimed away from a back of the mailbox, where the second security camera is configured for monitoring or recording behind the mailbox in a yard between the mailbox and the home, and of the home;
      wherein, the combination of the first security camera and the second security camera providing a 360 degree view around the mailbox for 24/7 monitoring or recording of the home, the yard, the mailbox, and its surroundings;
   the mailbox further including an illuminated street address on one or both sides of the mailbox;
   the mailbox including an illuminated panel on one or both side of the mailbox for providing the illuminated street address, custom messages, streaming ads, or a combination thereof, wherein the illuminated panels on one or both sides of the mailbox being displays configured to display the illuminated street address, the custom messages, the streaming ads, or combinations thereof in set time intervals, wherein the set time intervals being 10-15 seconds;
   the mailbox further including an automated shipment indicator configured for automatically indicating when outgoing mail is to be picked up by the mailman, wherein the automated shipment indicator is a red light positioned on the side of the mailbox that automatically illuminates when the outgoing mail is inserted into a courier canister through the receiving unit by an owner;
   the mailbox further including a breakaway feature at a base of the mailbox, the breakaway feature is configured to allow the mailbox to fold downwards at the base to avoid severe damage when the mailbox is hit;
   a receiving unit positioned in an inside of the home or on an outside of the home;
   pneumatic tubing connected between the mailbox and the receiving unit;
   a courier canister sized to hold mail and configured for moving back and forth in the pneumatic tubing between the mailbox and the receiving unit;
   the mailbox further including the automated door configured for automatically opening and closing for accessing a courier canister inside of the mailbox;
   a set of key fobs for operating the automated door of the mailbox, the set of key fobs including at least:
      a first key fob for use by the owner for operating the automated door; and
      a second key fob for use by the mailman for operating the automated door; and
   a compressor and control unit configured to control movements of the courier canister within the pneumatic tubing back and forth between the mailbox and the receiving unit, wherein the control unit is positioned in the receiving unit and includes a console configured for controlling:
      the automated door;
      the first security camera;
      the second security camera;
      the illumination light;
      the movements of the courier canister between the mailbox and the receiving unit;
      the illuminated panels on one or both sides of the mailbox configured to display the illuminated street address, custom messages, streaming ads, or combinations thereof in set time intervals, wherein the set time intervals being 10-15 seconds;

wherein, the residential pneumatic mailbox and mailing system is configured to transport the mail inside of the courier canister from the mailbox positioned along the curbside of the home to the receiving unit on the inside of the home or on the outside of the home, and vice versa; and wherein the mailbox of the residential pneumatic mailbox and mailing system is configured as a security system, an advertising tool, and a postal delivery mechanism.

* * * * *